United States Patent
Yu

(10) Patent No.: US 12,327,041 B2
(45) Date of Patent: Jun. 10, 2025

(54) METHOD AND APPARATUS FOR ADJUSTING DISK SEQUENCES OF HARD DISK BACKPLANES, STORAGE MEDIUM, AND ELECTRONIC DEVICE

(71) Applicant: Suzhou MetaBrain Intelligent Technology Co., Ltd., Suzhou (CN)

(72) Inventor: Hsinfu Yu, Suzhou (CN)

(73) Assignee: SUZHOU METABRAIN INTELLIGENT TECHNOLOGY CO., LTD., Suzhou (CN)

( * ) Notice: Subject to any disclaimer, the term of this patent is extended or adjusted under 35 U.S.C. 154(b) by 0 days.

(21) Appl. No.: 18/865,206

(22) PCT Filed: Jun. 21, 2023

(86) PCT No.: PCT/CN2023/101932
§ 371 (c)(1),
(2) Date: Nov. 12, 2024

(87) PCT Pub. No.: WO2024/130998
PCT Pub. Date: Jun. 27, 2024

(65) Prior Publication Data
US 2025/0110660 A1  Apr. 3, 2025

(30) Foreign Application Priority Data
Dec. 19, 2022  (CN) .................. 202211634913. X

(51) Int. Cl.
*G06F 3/06* (2006.01)
*G06F 13/42* (2006.01)

(52) U.S. Cl.
CPC .......... *G06F 3/0655* (2013.01); *G06F 3/0604* (2013.01); *G06F 3/0676* (2013.01); *G06F 13/4282* (2013.01); *G06F 2213/0028* (2013.01)

(58) Field of Classification Search
CPC .... G06F 3/0655; G06F 3/0604; G06F 3/0676; G06F 13/4282; G06F 2213/0028
See application file for complete search history.

(56) References Cited

U.S. PATENT DOCUMENTS

2008/0225474 A1* 9/2008 Flynn .................. H05K 7/1487
361/737
2012/0151097 A1  6/2012 Lambert et al.

FOREIGN PATENT DOCUMENTS

CN        102314380 A    1/2012
CN        104932922 A    9/2015
(Continued)

OTHER PUBLICATIONS

International Search Report and Written Opinion of corresponding PCT Application No. PCT/CN2023/101932 dated Sep. 20, 2023 including English translations (15 pages).
Search report of corresponding CN Priority Application No. CN202211634913.X dated Jan. 29, 2023 (3 pages).
(Continued)

*Primary Examiner* — Ryan Bertram
(74) *Attorney, Agent, or Firm* — Crowell & Moring LLP

(57) ABSTRACT

Provided are a method and apparatus for adjusting disk sequences of hard disk backplanes, a storage medium, and an electronic device. The method includes: sending a first instruction to a second hard disk backplane via a BMC, whereby the second hard disk backplane enters a low state from a high state, where a first disk sequence of a first hard disk backplane precedes a second disk sequence of the second hard disk backplane; controlling a SAS card to identify the first hard disk backplane so as to set a disk sequence of the first hard disk backplane as the first disk sequence; recovering the second hard disk backplane from the low state to the high state, controlling the SAS card to identify the second hard disk backplane in the high state so as to set a disk sequence of the second hard disk backplane as the second disk sequence.

20 Claims, 3 Drawing Sheets

(56) References Cited

FOREIGN PATENT DOCUMENTS

| CN | 107422985 | A | | 12/2017 | | |
|---|---|---|---|---|---|---|
| CN | 107450864 | A | * | 12/2017 | .......... | G06F 3/0604 |
| CN | 107885686 | A | | 4/2018 | | |
| CN | 109062831 | A | | 12/2018 | | |
| CN | 109614035 | A | * | 4/2019 | | |
| CN | 110489284 | A | * | 11/2019 | | |
| CN | 111880851 | A | | 11/2020 | | |
| CN | 112463475 | A | | 3/2021 | | |
| CN | 112988513 | A | | 6/2021 | | |
| CN | 113448631 | | | 9/2021 | | |
| CN | 115080128 | A | | 9/2022 | | |
| CN | 115480975 | A | | 12/2022 | | |
| CN | 115617719 | A | | 1/2023 | | |
| CN | 116301589 | A | * | 6/2023 | | |

OTHER PUBLICATIONS

First Office Action of corresponding CN Priority Application No. CN202211634913.X dated Feb. 3, 2023 including English translation (11 pages).

Supplementary Search report of corresponding CN Priority Application No. CN202211634913.X dated Feb. 17, 2023 (2 pages).

Second Office Action of corresponding CN Priority Application No. CN202211634913.X dated Feb. 21, 2023 including English translation (11 pages).

Notification to Grant Patent Right for Invention of corresponding CN Priority Application No. CN202211634913.X dated Mar. 14, 2023 including English translation, and including English translation of allowed claims of CN Priority Application No. CN202211634913.X (13 pages).

* cited by examiner

METHOD AND APPARATUS FOR ADJUSTING DISK SEQUENCES OF HARD DISK BACKPLANES, STORAGE MEDIUM, AND ELECTRONIC DEVICE

This application is the national phase application of International Patent Application No. PCT/CN2023/101932, filed Jun. 21, 2023, which claims priority to Chinese Patent Application No. 202211634913.X, entitled "METHOD AND APPARATUS FOR ADJUSTING DISK SEQUENCES OF HARD DISK BACKPLANES, STORAGE MEDIUM, AND ELECTRONIC ", filed to China National Intellectual Property Administration on Dec. 19, 2022. The contents of International Patent Application No. PCT/CN2023/101932 and Chinese Patent Application No. 202211634913.X are each incorporated by reference herein in their entireties.

FIELD

Embodiments of the present application relate to the field of Internet, in particular, to a method and apparatus for adjusting disk sequences of hard disk backplanes, a storage medium, and an electronic device.

BACKGROUND

A serial attached SCSI (SAS) is a disk connection technology. When two hard disk backplanes designed with Expander chips are cascaded via a single SAS card, hard disks on the first hard disk backplane and the second hard disk backplane may be sequenced in reverse probably. However, once the hard disks are sequenced under a system, a sequence definition has been completed and cannot be reset, even if the system is reset. In order to change the sequences of the hard disks on the two backplanes within the system, it is required to manually exchange installation positions of the two backplanes and then power on the two backplanes again before the sequences of the hard disks are correct.

For example, a single 8i SAS card has two output ports, namely port 0 and port 1, which mainly provide upstream bandwidth links for cascading hard disk backplanes with Expander chips. For example, assuming that a 24-port hard disk configuration is required for a server, two 12-port Expander chip hard disk backplanes may be combined into a 24-port hard disk. Because only the single 8i SAS card is connected to the two hard disk backplanes, port 0 and port 1 must be connected to the two hard disk backplanes with Expander chips respectively to supply uplink. Within the system, port 0 of the 8i SAS card is connected to the first 12-port Expander hard disk backplane, and port 1 is connected to the second 12-port Expander hard disk backplane. Generally, identifying disk sequences of hard disks under the system is: identifying hard disks on the first backplane in disk sequences of HDD0 to HDD11, and then identifying disk sequences of the second hard disk backplane as HDD12 to HDD23, where a total of 24 hard disks are formed. However, the problem is that the design of the single 8i SAS card does not specify a priority sequence of port 0 and port 1 in acquiring hard disks, but directly cascades port 0 and port 1 of the SAS card with two Expander hard disk backplanes, and then identifies a disk sequence between the SAS card and the hard disk backplanes when the system is powered on. If the SAS card and the first backplane are powered preferentially, in other words, the first backplane communicates with the SAS card earlier, a sequence of an enclosure ID will be acquired according to the hard disks on the first Expander backplane that has communicated with the SAS card. However, port 0 and port 1 of the 8i SAS card are connected to two Expander backplanes. Therefore, if port 1 of the SAS card first identifies the second hard disk backplane and then identifies the first hard disk backplane, the SAS card has completed the process of establishing an enclosurelist with the two backplanes, and recorded it inside an FRU ROM of a RAID. Thus, the disk sequences of the hard disks read under an OS every time the system is turned on has been fixed and will not be changed.

In the prior art, when a single SAS card is cascaded with one or more hard disk backplanes, disks on the hard disk backplanes are easily out of sequence and disk sequences can only be changed manually. For the problems, no effective solution has been proposed.

SUMMARY

Embodiments of the present application provide a method and apparatus for adjusting disk sequences of hard disk backplanes, a storage medium, and an electronic device, intended to at least solve the problems in the prior art that when a single SAS card is cascaded with one or more hard disk backplanes, disks on the hard disk backplanes are easily out of sequence and disk sequences can only be changed manually.

According to one embodiment of the present application, there is provided a method for adjusting disk sequences of hard disk backplanes. The method includes: sending a first target instruction to a second hard disk backplane via a baseboard management controller (BMC), whereby the second hard disk backplane enters a low state from a high state, where a first disk sequence of a first hard disk backplane precedes a second disk sequence of the second hard disk backplane, and the first hard disk backplane and the second hard disk backplane are connected to the BMC via a hard disk array card (SAS card); controlling the SAS card to identify the first hard disk backplane so as to set a disk sequence of the first hard disk backplane as the first disk sequence; and recovering the second hard disk backplane from the low state to the high state, and controlling the SAS card to identify the second hard disk backplane in the high state so as to set a disk sequence of the second hard disk backplane as the second disk sequence.

In an exemplary embodiment, the sending a first target instruction to a second hard disk backplane via a BMC, whereby the second hard disk backplane enters a low state from a high state includes: determining that the disk sequences of the first hard disk backplane and the second hard disk backplane are inconsistent with a preset target disk sequence, where the target disk sequence is used for indicating that the first disk sequence of the first hard disk backplane precedes the second disk sequence of the second hard disk backplane; and sending the first target instruction to the second hard disk backplane via the BMC, whereby the second hard disk backplane enters the low state from the high state.

In an exemplary embodiment, before the determining that the disk sequences of the first hard disk backplane and the second hard disk backplane are inconsistent with a preset target disk sequence, the method further includes: acquiring disk sequence list information in the SAS card, where the disk sequence list information includes disk sequence information of all hard disk backplanes connected to the SAS card; and acquiring the target disk sequence from the disk sequence list information.

In an exemplary embodiment, the sending a first target instruction to a second hard disk backplane via a BMC, whereby the second hard disk backplane enters a low state from a high state includes: sending an intelligent platform management interface (IPMI) instruction signal to the second hard disk backplane via the BMC, whereby the second hard disk backplane enters the low state from the high state; and/or directly issuing an IPMI instruction to the second hard disk backplane via the BMC in a case that firmware (FW) of the BMC is in a ready state, whereby the second hard disk backplane enters the low state from the high state.

In an exemplary embodiment, the controlling the SAS card to identify the first hard disk backplane so as to set a disk sequence of the first hard disk backplane as the first disk sequence includes: directly setting the identified disk sequence of the first hard disk backplane as the first disk sequence, in a case that the SAS communicates only with a first hard disk backplane of two hard disk backplanes, where the two hard disk backplanes include the first hard disk backplane and the second hard disk backplane.

In an exemplary embodiment, the recovering the second hard disk backplane from the low state to the high state includes: sending a second target instruction to the second hard disk backplane via the BMC in a case that the disk sequence of the first hard disk backplane has been determined as the first disk sequence, whereby the second hard disk backplane enters the high state from the low state.

In an exemplary embodiment, after the controlling the SAS card to identify the second hard disk backplane in the high state so as to set a disk sequence of the second hard disk backplane as the second disk sequence, the method further includes: acquiring a set first disk sequence of the first hard disk backplane and a set second disk sequence of the second hard disk backplane; and determining whether the set first disk sequence of the first hard disk backplane and the set second disk sequence of the second hard disk backplane are consistent with the target disk sequence.

In an exemplary embodiment, after the determining whether the set first disk sequence of the first hard disk backplane and the set second disk sequence of the second hard disk backplane are consistent with the target disk sequence, the method further includes: reporting a system logic error to a server via the BMC in a case that the set first disk sequence of the first hard disk backplane and the set second disk sequence of the second hard disk backplane are inconsistent with the target disk sequence; and restarting the server in a case that the server receives the system logic error.

In an exemplary embodiment, the method includes: sending the first target instruction to both the first hard disk backplane and the second hard disk backplane via the BMC in a case that the SAS card fails to identify the first hard disk backplane and the second hard disk backplane, whereby the first hard disk backplane and the second hard disk backplane enter the low state from the high state; recovering the first hard disk backplane from the low state to the high state, and controlling the SAS card to identify the first hard disk backplane in the high state so as to set the disk sequence of the first hard disk backplane as the first disk sequence; and recovering the second hard disk backplane from the low state to the high state, and controlling the SAS card to identify the second hard disk backplane in the high state so as to set the disk sequence of the second hard disk backplane as the second disk sequence.

In an exemplary embodiment, after the sending a first target instruction to a second hard disk backplane via a BMC, whereby the second hard disk backplane enters a low state from a high state, the method further includes: clearing cache information of the first hard disk backplane and the second hard disk backplane in a server, where the cache information includes the disk sequence of the first hard disk backplane and the disk sequence of the second hard disk backplane; and controlling, via the BMC, the server to enter the low state.

In an exemplary embodiment, the recovering the second hard disk backplane from the low state to the high state includes: determining a duration for which the second hard disk backplane is in the low state; and directly recovering the second hard disk backplane from the low state to the high state in a case that the duration exceeds a preset threshold.

In an exemplary embodiment, whether the disk sequences of the first hard disk backplane and the second hard disk backplane are consistent with the preset target disk sequence is determined by: acquiring all hard disk backplanes connected to the SAS card; acquiring a set of hard disk backplanes from all the hard disk backplanes according to a preset rule, where the set of hard disk backplanes includes: the first hard disk backplane and the second hard disk backplane, and all the hard disk backplanes include a plurality of sets of hard disk backplanes; and determining whether a disk sequence of the set of hard disk backplanes is consistent with the preset target disk sequence.

In an exemplary embodiment, the acquiring a set of hard disk backplanes from all the hard disk backplanes according to a preset rule includes: acquiring a historical number of occurrences of disk sequence reversal of the plurality of sets of hard disk backplanes; determining a maximum target number of occurrences from the historical number of occurrences; and determining a set of hard disk backplanes corresponding to the maximum target number of occurrences as the set of hard disk backplanes acquired according to the preset rule.

In an exemplary embodiment, the acquiring a set of hard disk backplanes from all the hard disk backplanes according to a preset rule includes: acquiring priority information of occurrences of the plurality of sets of hard disk backplanes; determining a top priority from the priority information; and determining a set of hard disk backplanes corresponding to the top priority as the set of hard disk backplanes acquired according to the preset rule.

In an exemplary embodiment, after the sending a first target instruction to a second hard disk backplane via a BMC, whereby the second hard disk backplane enters a low state from a high state, the method further includes: acquiring a backplane identifier of the second hard disk backplane in a case that the second hard disk backplane fails to enter the low state; determining a first backplane identifier other than the backplane identifier of the second hard disk backplane from a first backplane identifier of the first hard disk backplane and a second backplane identifier of the second hard disk backplane; and controlling the SAS card to identify the first hard disk backplane corresponding to the first backplane identifier so as to set the disk sequence of the first hard disk backplane as the first disk sequence.

In an exemplary embodiment, after the recovering the second hard disk backplane from the low state to the high state, the method further includes: directly determining the disk sequence of the second hard disk backplane as the second disk sequence in a case that the second hard disk backplane fails to be recovered to the high state.

According to another embodiment of the present application, there is provided a system for adjusting disk sequences of hard disk backplanes. The system includes: a motherboard, a BMC arranged on the motherboard, and a first hard disk backplane and a second hard disk backplane connected to the BMC via a hard disk array card (SAS card). The BMC is configured to send a first target instruction to a second hard disk backplane, whereby the second hard disk backplane enters a low state from a high state, where a first disk sequence of a first hard disk backplane precedes a second disk sequence of the second hard disk backplane. The SAS card is configured to identify the first hard disk backplane so as to set a disk sequence of the first hard disk backplane as the first disk sequence, recover the second hard disk backplane from the low state to the high state, and control the SAS card to identify the second hard disk backplane in the high state so as to set a disk sequence of the second hard disk backplane as the second disk sequence.

In an exemplary embodiment, the first hard disk backplane is connected to a first port of the motherboard via the SAS card, and the second hard disk backplane is connected to a second port of the motherboard via the SAS card. The BMC is connected to the SAS card via a bidirectional binary synchronous serial bus I2C. The BMC is connected to the first hard disk backplane via a first GPIO interface and is connected to the second hard disk backplane via a second GPIO interface.

In an exemplary embodiment, the BMC is further configured to: send an IPMI instruction to the second hard disk backplane, whereby the second hard disk backplane enters the low state from the high state; and/or directly issue the IPMI instruction to the second hard disk backplane in a case that FW of the BMC is in a ready state, whereby the second hard disk backplane enters the low state from the high state.

According to still another embodiment of the present application, there is also provided a non-volatile readable storage medium. The non-volatile readable storage medium has a computer program stored therein. The computer program, when executed by a processor, implements the method for adjusting disk sequences of hard disk backplanes.

According to still another embodiment of the present application, there is also provided an electronic device, including a memory, a processor, and a computer program stored in the memory and executable on the processor. The processor is configured to execute the computer program to implement the method for adjusting disk sequences of hard disk backplanes.

According to the present application, a first target instruction is sent to a second hard disk backplane via a BMC, whereby the second hard disk backplane enters a low state from a high state, where a first disk sequence of a first hard disk backplane precedes a second disk sequence of the second hard disk backplane, and the first hard disk backplane and the second hard disk backplane are connected to the BMC via a hard disk array card (SAS card). The SAS card is controlled to identify the first hard disk backplane so as to set a disk sequence of the first hard disk backplane as the first disk sequence. The second hard disk backplane is recovered from the low state to the high state, and the SAS card is controlled to identify the second hard disk backplane in the high state so as to set a disk sequence of the second hard disk backplane as the second disk sequence. In other words, a hard disk backplane having a succeeding disk sequence enters the low state, whereby the SAS card may be controlled to identify a hard disk backplane having a preceding disk sequence, and the disk sequences may be forward sequences. Therefore, the problems in the related art that when a single SAS card is cascaded with one or more hard disk backplanes, disks on the hard disk backplanes are easily out of sequence and disk sequences can only be changed manually can be solved, without manually correcting the disk sequences of the hard disks.

DETAILED DESCRIPTION

Hereinafter, embodiments of the present application will be described in detail with reference to the accompanying drawings and in conjunction with the embodiments.

It is to be noted that the terms "first", "second", and the like in the specification and claims of the present application and the drawings are used for distinguishing similar objects, and are not necessarily used for describing a specific order or sequence.

Figure 1:
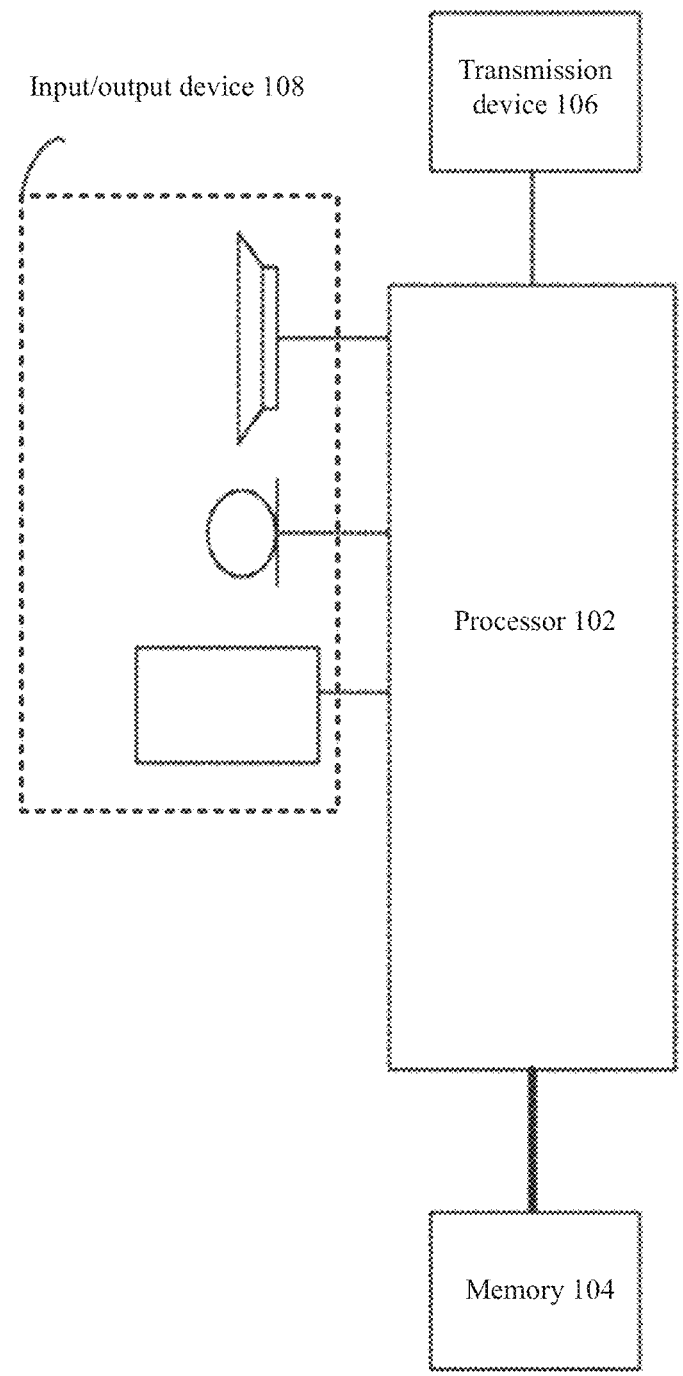
FIG. 1 is a hardware structure block diagram of a computer terminal for an optional method for adjusting disk sequences of hard disk backplanes according to an embodiment of the present application.

Method embodiments provided in the embodiments of the present application may be executed in a computer terminal, a computer terminal, or a similar arithmetic apparatus. The method embodiments are executed, for example, on the computer terminal. FIG. 1 is a hardware structure block diagram of a computer terminal for a method for adjusting disk sequences of hard disk backplanes according to an embodiment of the present application. As shown in FIG. 1, the computer terminal may include one or more (only one in FIG. 1) processors 102 (the processor 102 may include, but is not limited to, a processing apparatus such as a micro control unit (MCU) or a field programmable gate array (FPGA)) and a memory 104 for storing data. The computer terminal may further include a transmission device 106 for communication functions and an input/output device 108. A person of ordinary skill in the art will appreciate that the structure shown in FIG. 1 is merely schematic, and does not limit the structure of the computer terminal. For example, the computer terminal may further include more or fewer components than shown in FIG. 1, or have a different configuration than shown in FIG. 1.

The memory 104 may be configured to store a computer program, for example, a software program and module of application software, such as a computer program corresponding to a method for adjusting disk sequences of hard disk backplanes in the embodiments of the present application. The processor 102 executes various functional applications and data processing by executing the computer program stored in the memory 104. In other words, the foregoing method is implemented. The memory 104 may include a high-speed random access memory, and may further include a non-volatile memory, such as one or more magnetic storage apparatuses, a flash memory, or other non-volatile solid state memories. In some examples, the memory 104 may further include memories arranged remotely from the processor 102. The remote memories may be connected to the computer terminal over a network. Examples of the network include, but are not limited to, the Internet, the Intranet, a local area network, a mobile communication network, and combinations thereof.

The transmission device 106 is configured to receive or send data via a network. Specific examples of the network may include a wireless network provided by a communication provider of the computer terminal. In one example, the transmission device 106 includes a network interface controller (NIC) that may be connected to other network devices through a base station to communicate with the Internet. In one example, the transmission device 106 may be a radio frequency (RF) module for wirelessly communicating with the Internet.

Figure 2:
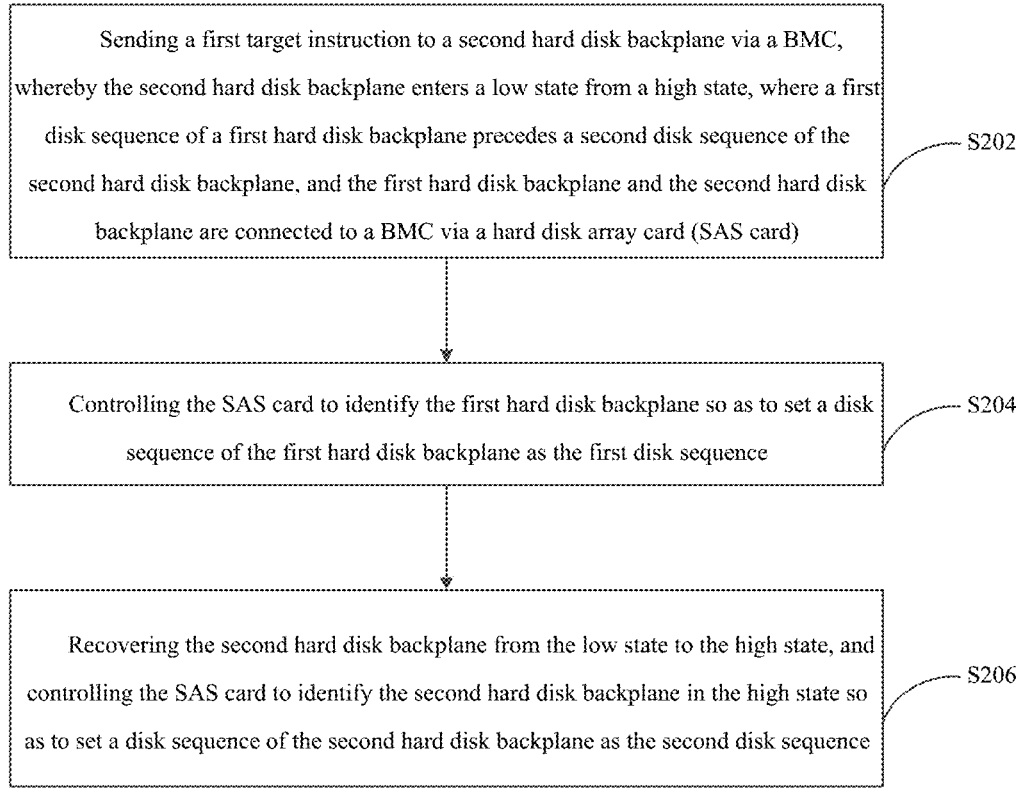
FIG. 2 is a flowchart of an optional method for adjusting disk sequences of hard disk backplanes according to an embodiment of the present application.

A method for adjusting disk sequences of hard disk backplanes executed on the computer terminal is provided in this embodiment. FIG. 2 is a flowchart of an optional method for adjusting disk sequences of hard disk backplanes according to an embodiment of the present application. As shown in FIG. 2, the process includes the following steps:

Step S202: sending a first target instruction to a second hard disk backplane via a BMC, whereby the second hard disk backplane enters a low state from a high state, where a first disk sequence of a first hard disk backplane precedes a second disk sequence of the second hard disk backplane, and the first hard disk backplane and the second hard disk backplane are connected to a BMC via a hard disk array card (SAS card).

It is to be noted that the BMC is a baseboard management controller.

Step S204: controlling the SAS card to identify the first hard disk backplane so as to set a disk sequence of the first hard disk backplane as the first disk sequence.

Step S206: recovering the second hard disk backplane from the low state to the high state, and controlling the SAS card to identify the second hard disk backplane in the high state so as to set a disk sequence of the second hard disk backplane as the second disk sequence.

According to the foregoing steps, a first target instruction is sent to a second hard disk backplane via a BMC, whereby the second hard disk backplane enters a low state from a high state, where a first disk sequence of a first hard disk backplane precedes a second disk sequence of the second hard disk backplane, and the first hard disk backplane and the second hard disk backplane are connected to a BMC via a hard disk array card (SAS card). The SAS card is controlled to identify the first hard disk backplane so as to set a disk sequence of the first hard disk backplane as the first disk sequence. The second hard disk backplane is recovered from the low state to the high state, and the SAS card is controlled to identify the second hard disk backplane in the high state so as to set a disk sequence of the second hard disk backplane as the second disk sequence. In other words, a hard disk backplane having a succeeding disk sequence enters the low state, whereby the SAS card may be controlled to identify a hard disk backplane having a preceding disk sequence, and the disk sequences may be forward sequences. Therefore, the problems in the related art that when a single SAS card is cascaded with one or more hard disk backplanes, disks on the hard disk backplanes are easily out of sequence and disk sequences can only be changed manually can be solved, without manually correcting the disk sequences of the hard disks.

In an exemplary embodiment, the sending a first target instruction to a second hard disk backplane via a BMC, whereby the second hard disk backplane enters a low state from a high state includes: determining that the disk sequences of the first hard disk backplane and the second hard disk backplane are inconsistent with a preset target disk sequence, where the target disk sequence is used for indicating that the first disk sequence of the first hard disk backplane precedes the second disk sequence of the second hard disk backplane; and sending the first target instruction to the second hard disk backplane via the BMC, whereby the second hard disk backplane enters the low state from the high state.

It is to be noted that when a hard disk backplane is identified, a server allocates a hard disk sequence number, namely, a disk sequence, to hard disks on the hard disk backplane. By way of example, under the premise that there are only two hard disk backplanes, if the first hard disk backplane is identified first and 12 hard disks are expanded on the first hard disk backplane, the server may allocate disk sequences of 0 to 11 to hard disks on the first hard disk backplane, and if the first hard disk backplane is identified later, the server allocates disk sequences of 12-23 to the hard disks on the first hard disk backplane. By comparing the allocated disk sequences of the first hard disk backplane and the second hard disk backplane with a preset target disk sequence, it is possible to determine whether the hard disks are out of sequence.

Further, before the determining that the disk sequences of the first hard disk backplane and the second hard disk backplane are inconsistent with a preset target disk sequence, the method further includes: acquiring disk sequence list information in the SAS card, where the disk sequence list information includes disk sequence information of all hard disk backplanes connected to the SAS card; and acquiring the target disk sequence from the disk sequence list information.

Figure 3:
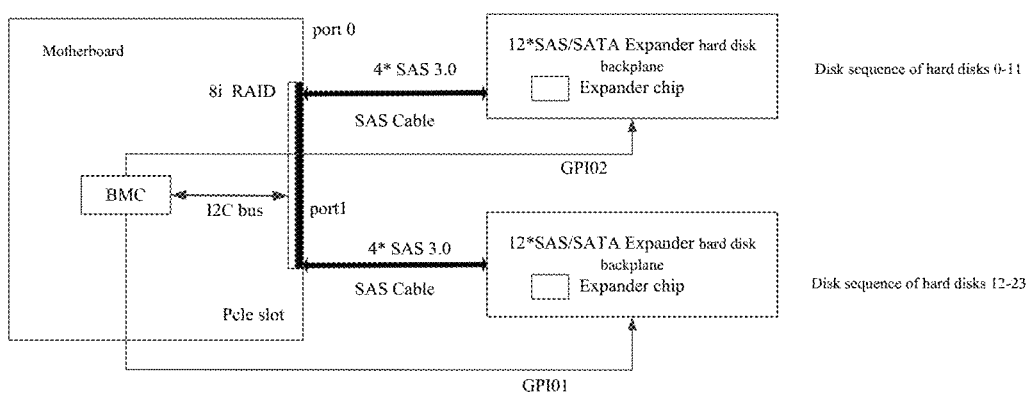
FIG. 3 is a topology diagram of two 12-port Expander hard disk backplanes of a server for an optional method for adjusting disk sequences of hard disk backplanes according to an embodiment of the present application.

Specifically, identified disk sequence list information regarding the disk sequences of the hard disks on the first hard disk backplane and the second hard disk backplane is read from the SAS card. By way of example, as shown in FIG. 3, assuming that the disk sequences corresponding to the first hard disk backplane may be 0-11 and the disk sequences corresponding to the second hard disk backplane may be 12-23, the target disk sequences should be 0-23 in a case that the first hard disk backplane is identified ahead of the second hard disk backplane. At this moment, the identified disk sequences may be divided in two cases. In the first case, the identified disk sequences are forward sequences. In other words, the disk sequence list information recorded in the SAS card is 0-23. Then a result indicating that the disk sequence list information is consistent with the target disk sequence may be obtained, and then it may be determined that the identification process is correct. In the second case, the identified disks are out of sequence. In other words, the disk sequence list information recorded in the SAS card is 12-23 and 0-11. Then a result indicating that the disk sequence list information is inconsistent with the target disk sequence may be obtained, and then it may be determined that the identification process is incorrect. It is to be noted that the number of hard disk backplanes is equal to or greater than 1, and the embodiments of the present application are not limited thereto.

When it is determined that the disks are out of sequence, the sending a first target instruction to a second hard disk backplane via a BMC, whereby the second hard disk backplane enters a low state from a high state includes: sending an IPMI instruction signal to the second hard disk backplane via the BMC, whereby the second hard disk backplane enters the low state from the high state; and/or directly issuing an IPMI instruction to the second hard disk backplane via the BMC in a case that FW of the BMC is in a ready state, whereby the second hard disk backplane enters the low state from the high state.

It will be appreciated that the BMC sends an IPMI instruction signal to an actually succeeding hard disk backplane in a case that the disks have been out of sequence, whereby the actually succeeding hard disk backplane enters the low state, and then an actually top-ranked hard disk backplane may be identified first. It is to be noted that the IPMI instruction is directly sent in a case that the disk sequences of the hard disks have not been identified, that is, the FW of the BMC is in the ready state, whereby the actually succeeding hard disk backplane enters the low state, thereby preventing the hard disks from being out of sequence.

After the actually succeeding hard disk backplane enters the low state, the controlling the SAS card to identify the first hard disk backplane so as to set a disk sequence of the first hard disk backplane as the first disk sequence includes: directly setting the identified disk sequence of the first hard disk backplane as the first disk sequence, in a case that the SAS communicates only with a first hard disk backplane of two hard disk backplanes, where the two hard disk backplanes include the first hard disk backplane and the second hard disk backplane.

It will be appreciated that only the actually top-ranked hard disk backplane is in the high state in a case that all the actually succeeding hard disk backplanes enter the low state. At this moment, the identified disk sequence of the actually top-ranked hard disk backplane is the first disk sequence.

Optionally, the recovering the second hard disk backplane from the low state to the high state includes: sending a second target instruction to the second hard disk backplane via the BMC in a case that the disk sequence of the first hard disk backplane has been determined as the first disk sequence, whereby the second hard disk backplane enters the high state from the low state.

It is to be noted that the second hard disk backplane is actually released. When there are three or more hard disk backplanes, it is assumed that corresponding sequence numbers of the hard disk backplanes are 1, 2, and 3 respectively, and an identification sequence of the hard disk backplanes is 1-2-3. Backplane 1 has been identified, and backplanes 2 and 3 are in the low state. At this moment, hard disk backplane 2 is released first, and hard disk backplane 3 is still in the low state. In other words, in a case that the top-ranked hard disk backplane is identified, a hard disk backplane succeeding the top-ranked hard disk backplane is released, while other hard disk backplanes are still in the low state.

After the disk sequences of the hard disk backplanes are corrected, an optional embodiment is as follows:

1) After the controlling the SAS card to identify the second hard disk backplane in the high state so as to set a disk sequence of the second hard disk backplane as the second disk sequence, the method further includes: acquiring a set first disk sequence of the first hard disk backplane and a set second disk sequence of the second hard disk backplane; and determining whether the set first disk sequence of the first hard disk backplane and the set second disk sequence of the second hard disk backplane are consistent with the target disk sequence.

2) After the determining whether the set first disk sequence of the first hard disk backplane and the set second disk sequence of the second hard disk backplane are consistent with the target disk sequence, the method further includes: reporting a system logic error to a server via the BMC in a case that the set first disk sequence of the first hard disk backplane and the set second disk sequence of the second hard disk backplane are inconsistent with the target disk sequence; and restarting the server in a case that the server receives the system logic error.

Specifically, if the first disk sequence and the second disk sequence are still inconsistent with the target disk sequence, the system logic error is directly determined, the error is reported to the server, and the server is restarted. The server carries the first hard disk backplane, the second hard disk backplane, the BMC, and the SAS card.

In an optional embodiment, the method includes: sending the first target instruction to both the first hard disk backplane and the second hard disk backplane via the BMC in a case that the SAS card fails to identify the first hard disk backplane and the second hard disk backplane, whereby the first hard disk backplane and the second hard disk backplane enter the low state from the high state; recovering the first hard disk backplane from the low state to the high state, and controlling the SAS card to identify the first hard disk backplane in the high state so as to set the disk sequence of the first hard disk backplane as the first disk sequence; and recovering the second hard disk backplane from the low state to the high state, and controlling the SAS card to identify the second hard disk backplane in the high state so as to set the disk sequence of the second hard disk backplane as the second disk sequence.

It will be appreciated that the IPMI instruction is directly sent in a case that the SAS card does not identify hard disk backplanes, whereby hard disk backplanes other than the first hard disk backplane that is top-ranked are all in the low state, thereby identifying the first hard disk backplane and sequentially releasing and identifying the succeeding hard disk backplanes. For example, assuming that the sequence numbers of the hard disk backplanes are 1, 2, 3, 4, and 5, and the identification sequence of the hard disk backplanes is 1-4-5-2-3, the specific operation is: pulling down 2, 3, 4, and 5, and identifying 1; releasing 4, and identifying 4; releasing 5, identifying 5, releasing 2, identifying 2, releasing 3, and identifying 3.

Optionally, after the sending a first target instruction to a second hard disk backplane via a BMC, whereby the second hard disk backplane enters a low state from a high state, the method further includes: clearing cache information of the first hard disk backplane and the second hard disk backplane in a server, where the cache information includes the disk sequence of the first hard disk backplane and the disk sequence of the second hard disk backplane; and controlling, via the BMC, the server to enter the low state. In other words, in a case that the disks are out of sequence, in order for forward sequences, the disk sequence of the first hard disk backplane and the disk sequence of the second hard disk backplane stored in the system are cleared after the second hard disk backplane is pulled down, and the system also enters the low state.

Optionally, the recovering the second hard disk backplane from the low state to the high state includes: determining a duration for which the second hard disk backplane is in the low state; and directly recovering the second hard disk backplane from the low state to the high state in a case that the duration exceeds a preset threshold.

Specifically, the preset threshold may be 1 ms or 1 us, which may be set by a user. The preset threshold is reserved time for identifying the disk sequence of the first hard disk backplane. If the duration for which the second hard disk backplane is in the low state exceeds the preset threshold, there may be a delay or error in a release instruction, or there may be an error in identifying the first hard disk backplane, or there may be an error in hardware connection. In this case, the second hard disk backplane is directly released to check whether successful identification is achieved. Furthermore, in a case that there are two or more hard disk backplanes, a different preset threshold may be set for each hard disk backplane in the low state, or a uniform preset threshold may be set for all the hard disk backplanes in the low state.

In a set of hard disk backplanes among a plurality of sets of hard disk backplanes, whether the disk sequences of the first hard disk backplane and the second hard disk backplane are consistent with the preset target disk sequence is determined by: acquiring all hard disk backplanes connected to the SAS card; acquiring a set of hard disk backplanes from all the hard disk backplanes according to a preset rule, where the set of hard disk backplanes includes: the first hard disk backplane and the second hard disk backplane, and all the hard disk backplanes include a plurality of sets of hard disk backplanes; and determining whether a disk sequence of the set of hard disk backplanes is consistent with the preset target disk sequence.

It will be appreciated that there may be a plurality of sets of hard disk backplanes in the system, and it is necessary to determine a set of hard disk backplanes having hard disks that need to be resequenced from the plurality of sets of hard disk backplanes.

An optional embodiment relating to acquiring a set of hard disk backplanes from the plurality of sets of hard disk backplanes is as follows:

1) The acquiring a set of hard disk backplanes from all the hard disk backplanes according to a preset rule includes: acquiring a historical number of occurrences of disk sequence reversal of the plurality of sets of hard disk backplanes; determining a maximum target number of occurrences from the historical number of occurrences; and determining a set of hard disk backplanes corresponding to the maximum target number of occurrences as the set of hard disk backplanes acquired according to the preset rule.

2) The acquiring a set of hard disk backplanes from all the hard disk backplanes according to a preset rule includes: acquiring priority information of occurrences of the plurality of sets of hard disk backplanes; determining a top priority from the priority information; and determining a set of hard disk backplanes corresponding to the top priority as the set of hard disk backplanes acquired according to the preset rule.

It will be appreciated that the preset rule for acquiring a set of hard disk backplanes from all the hard disk backplanes may be that a set of hard disk backplanes having a maximum historical number of occurrences of disks out of sequence is determined as an object to be acquired, or a set of hard disk backplanes having a top priority among a plurality of sets of hard disk backplanes is determined as an object to be acquired.

Optionally, after the sending a first target instruction to a second hard disk backplane via a BMC, whereby the second hard disk backplane enters a low state from a high state, the method further includes: acquiring a backplane identifier of the second hard disk backplane in a case that the second hard disk backplane fails to enter the low state; determining a first backplane identifier other than the backplane identifier of the second hard disk backplane from a first backplane identifier of the first hard disk backplane and a second backplane identifier of the second hard disk backplane; and controlling the SAS card to identify the first hard disk backplane corresponding to the first backplane identifier so as to set the disk sequence of the first hard disk backplane as the first disk sequence.

Specifically, in a case that the second hard disk backplane fails to enter the low state, identification is performed according to the backplane identifiers of the hard disk backplanes. In a case that there are only two hard disk backplanes, a second backplane identifier of the second hard disk backplane is acquired, and a backplane identifier other than the second backplane identifier, namely, a first backplane identifier, is identified. When at least one of the following cases exist in the system: there are two or more hard disk backplanes and two or more hard disk backplanes exist in a set of hard disk backplanes, if at least one of the following situations exist: hard disks other than the top-ranked hard disk backplane fail to enter the low state and all hard disks fail to enter the low state, backplane identifiers of the hard disk backplanes that fail to enter the low state are acquired.

Optionally, after the recovering the second hard disk backplane from the low state to the high state, the method further includes: directly determining the disk sequence of the second hard disk backplane as the second disk sequence in a case that the second hard disk backplane fails to be recovered to the high state.

In other words, in a case that there are only two hard disk backplanes and the second hard disk backplane is identified later, a second disk sequence may be directly determined even if the second hard disk backplane fails to recover the high state after a first disk sequence is identified.

Figure 4:
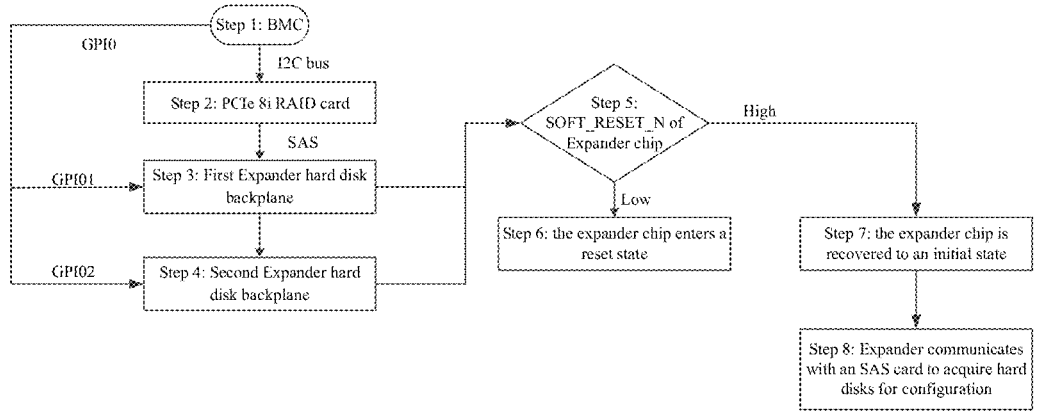
FIG. 4 is an operation flowchart of an optional method for adjusting disk sequences of hard disk backplanes according to an embodiment of the present application.

In order to better understand the method for adjusting disk sequences of hard disk backplanes, in an optional embodiment, the following implementation steps are further provided for explaining the foregoing solutions. FIG. 4 is an operation flowchart of an optional method for adjusting disk sequences of hard disk backplanes according to an embodiment of the present application. As shown in FIG. 4, the process includes the following specific steps:

Step 1: a BMC performs an I2C instruction.

It is to be noted that after a system AC is powered on, power is outputted to all cards. After being ready for 5 minutes, the BMC may perform the I2C instruction.

Step 2: a PCIe 8i RAID card communicates with two backplanes.

After the RAID card communicates with the two backplanes completely, an enclosure ID (EID) is set completely and stored into an NSRAM.

At this moment, it is assumed that:

disk sequence reversal of hard disks of the first backplane and the second backplane is confirmed.

The system AC is not required to be powered off, and a chip on each Expander backplane is connected to a GPIO of a BMC via an interface terminal at a soft reset pin of the hardware design.

Step 3: a First Expander hard disk backplane receives an IPMI instruction of the BMC via GPIO1.

Step 4: a Second Expander hard disk backplane receives an IPMI instruction of the BMC via GPIO2.

Specifically, two GPIO signals of the BMC and SOFT_RESET_N signals on Expander chips of the two backplanes are connected to each other. Therefore, the BMC may control Expander timing on the backplanes or allow Expander to enter a reset state via the GPIO signals.

It is to be noted that after the BMC is connected to the SOFT_RESET_N signals of the Expander chips via a GPIO path, the BMC may issue an IPMI instruction to the Expander chips on the backplanes to allow the Expander chips to enter the reset state or not according to system configuration application setting conditions. correspondingly, the BMC may also control the operation process and timing of the Expander chips.

Step 5: determining whether SOFT_RESET_N of an Expander chip is pulled down, proceeding to step 6 at Low, and proceeding to step 7 at High.

Step 6: the Expander chip enters a reset state.

The SOFT_RESET_N signal of Expander hardware of the second backplane may be directly pulled down via a GPIO pin of the BMC to form signal pairs to be short-circuited together, and the Expander chip may enter the Reset state.

Then the system is also reset. Before reset, data of the Expander SRAM may be cleared first. At this moment, the SOFT_RESET_N signals are still in a low state.

After a server enters an operating system (OS) state, a hard disk sequence is checked. At this moment, because the second backplane cannot communicate normally with the RAID card to acquire hard disks and other information, only the Expander of the first backplane communicates with an SAS card and may acquire the hard disk sequence normally.

Step 7: the Expander chip is recovered to an initial state.

Step 8: Expander communicates with an SAS card to acquire hard disks for configuration.

After confirming that the first hard disk backplane has acquired hard disk information normally, the GPIO of the BMC will release the SOFT_RESET_N signal and recover the signal to a high-level state. Then, the OS is entered to check whether the system can find the hard disks under the second backplane. It is also checked whether the disk sequences of all the hard disks on the two backplanes are corrected. In other words, the first backplane is prioritized followed by the second backplane.

Further, FIG. 3 is a topology diagram of two 12-port Expander hard disk backplanes of a server for an optional method for adjusting disk sequences of hard disk backplanes according to an embodiment of the present application. As shown in FIG. 3:

A server motherboard contains a PCIe card slot in which an 8i PCIe SAS card is inserted. The 8i PCIe SAS card has two outputs, namely SAS port 0 and SAS port 1. Two SAS x4 signal bandwidths may be provided to uplink interface connection of two 12-port Expander hard disk backplanes, and Expander chips on the hard disk backplanes are expanded to 12 SAS/SATA hard disks.

As shown in FIG. 3, disk sequences of the two hard disk backplanes are as follows. The disk sequences of the hard disks under the first backplane are 0-11, and the disk sequences of the hard disks under the second backplane are 12-23. A BMC communicates with a PCIe RAID card via an I2C bus, and then may read an enclosure list of the RAID. This message is relevant information identified after the RIAD card communicates with the Expander chip on a downlink Expander hard disk backplane. Through this message, an enclosure ID under the Expander chip may be queried. This information may be used for distinguishing at least one of the following disk sequences: the disk sequence of the first Expander hard disk backplane and the disk sequence of the second Expander hard disk backplane.

According to another optional embodiment of the present application, the server may directly issue an IPMI instruction to pull down a SOFT_RESET_N signal on the Expander chip of the second Expander hard disk backplane when FW of the BMC is already in a ready state, whereby the Expander chip enters a reset state. At this moment, the SAS card cannot communicate with the second hard disk backplane, cannot acquire the enclosure ID, and then only identifies the enclosure ID under the Expander chip of the first hard disk backplane. After the server enters the OS, the BMC releases the SOFT_RESET_N signal on the Expander chip of the second hard disk backplane. Then the SAS card may communicate with the second hard disk backplane, and then allocate the enclosure ID to the hard disk under the Expander chip. This operation can first avoid the out-of-sequence phenomenon of the hard disks on the two backplanes.

It is to be noted that because the two GPIO signals of the BMC are respectively connected to the SOFT_RESET_N signals on the Expander chips of the two backplanes, the expander chips on the two backplanes may also be reset for a short time by the BMC via the IPMI instruction and then recovered sequentially, so as to adjust and control the SAS card and the sequence of acquiring backplane hard disks.

Generally, the server will be booted and tested after installing the system configuration. The problem to be solved in the present application is: when a single PCIe 8i SAS card is configured and applied by the system and SAS port 0 and SAS port 1 are connected to two hard disk backplanes with expander at the same time, the backplane connected to SAS port 1 will be probably identified first, and the backplane connected to SAS port 0 will be identified later. According to the present application, the problem of probability generation is solved, and it is unnecessary to correct the disk sequence through the operation of changing backplane cards based on manual maintenance. In other words, when it is found in the OS that the disk sequences of the hard disks under the two backplanes are reversed, the IPMI instruction may be issued via the BMC, whereby the expander chips on the backplanes with reverse disk sequences enter a reset state, the system is restarted, and the reset state of the expander chips on the backplanes is released after the system enters the OS, thereby recovering the normal disk sequences.

It is also to be noted that 1) SAS port0 and SAS port 1 of the SAS card allocate the enclosure ID of the hard disks based on a response sequence of devices connected to a back end, a smaller number (enclosure ID) is allocated to the priority response, and the smaller ID number is ahead of a larger ID number. When the hard disks of the second backplane respond to the SAS card before the hard disks of the first backplane, the hard disk sequence of the second backplane is displayed first.

2) Sequencing manner of SAS card: the SAS card will maintain a list of enclosure IDs, which records the enclosure IDs of the hard disks currently connected to the SAS card, and the sequence number allocated to each enclosure ID is independent and will not be changed. When the SAS card fully initializes the enclosure for the first time and allocates a certain number, this number will be used in the future. Even if it is removed and reinstalled, the number will not be changed. Therefore, probabilistically, if the hard disk backplane under the OS has been out of sequence, this out-of-sequence phenomenon will always exist.

Therefore, according to the present application, the problem of probability generation can be solved, and it is unnecessary to correct the disk sequence through the operation of changing backplane cards based on manual maintenance. When it is found in the OS that the disk sequences of the hard disks under the two backplanes are reversed, the IPMI instruction may be issued via the BMC, whereby the expander chips on the backplanes with reverse disk sequences enter a reset state, the system is restarted, and the reset state of the expander chips on the backplanes is released after the system enters the OS, thereby recovering the normal disk sequences. Therefore, the present application not only solves the problem of disk sequence reversal of hard disks, but also saves a lot of manpower and maintenance time in production testing. Furthermore, the present application can reduce the correction time and manpower of an operator when hard disks are out of sequence in the presence of a larger system number and more system configurations.

From the above description of the implementations, it will be clear to a person skilled in the art that the method according to the above embodiments may be implemented by software and a necessary general-purpose hardware platform, and may also be indeed implemented by hardware. However, the former is a preferred implementation in many cases. Based on this understanding, the technical solutions of the present application, in essence or in part contributing to the related art, may be embodied in the form of a software product, which is stored in a storage medium (such as a ROM/RAM, a magnetic disk, and an optical disc) and includes several instructions for causing a terminal device (which may be a mobile phone, a computer, a server, or a network device) to perform the method according to various embodiments of the present application.

Figure 5:
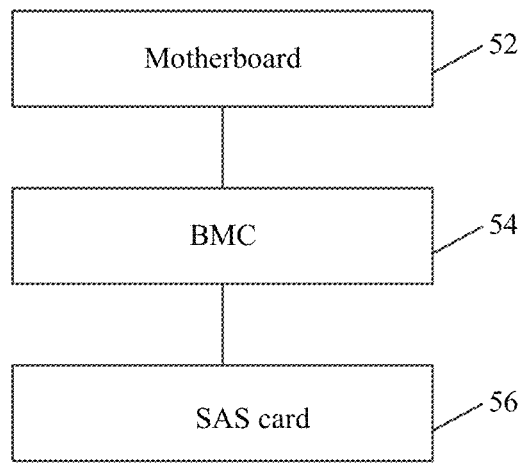
FIG. 5 is a structural block diagram of an optional system for adjusting disk sequences of hard disk backplanes according to an embodiment of the present application.

A system for adjusting disk sequences of hard disk backplanes is also provided in this embodiment. FIG. 5 is a structural block diagram of a system for adjusting disk sequences of hard disk backplanes according to an embodiment of the present application. As shown in FIG. 5, the system includes:

a motherboard 52, a BMC arranged on the motherboard, and a first hard disk backplane and a second hard disk backplane connected to the BMC via a hard disk array card (SAS card).

The BMC 54 is configured to send a first target instruction to a second hard disk backplane, whereby the second hard disk backplane enters a low state from a high state, where a first disk sequence of a first hard disk backplane precedes a second disk sequence of the second hard disk backplane.

The SAS card 56 is configured to identify the first hard disk backplane so as to set a disk sequence of the first hard disk backplane as the first disk sequence, recover the second hard disk backplane from the low state to the high state, and control the SAS card to identify the second hard disk backplane in the high state so as to set a disk sequence of the second hard disk backplane as the second disk sequence.

According to the present application, a first target instruction is sent to a second hard disk backplane via a BMC, whereby the second hard disk backplane enters a low state from a high state, where a first disk sequence of a first hard disk backplane precedes a second disk sequence of the second hard disk backplane, and the first hard disk backplane and the second hard disk backplane are connected to a BMC via a hard disk array card (SAS card). The SAS card is controlled to identify the first hard disk backplane so as to set a disk sequence of the first hard disk backplane as the first disk sequence. The second hard disk backplane is recovered from the low state to the high state, and the SAS card is controlled to identify the second hard disk backplane in the high state so as to set a disk sequence of the second hard disk backplane as the second disk sequence. In other words, in a case that hard disks are out of sequence, a hard disk backplane having a succeeding disk sequence enters the low state, whereby the SAS card may be controlled to identify a hard disk backplane having a preceding disk sequence, and the disk sequences may be forward sequences. Therefore, the problems in the related art that when a single SAS card is cascaded with one or more hard disk backplanes, disks on the hard disk backplanes are easily out of sequence and disk sequences can only be changed manually can be solved, without manually correcting the disk sequences of the hard disks.

In an exemplary embodiment, the BMC 54 is further configured to: determine that the disk sequences of the first hard disk backplane and the second hard disk backplane are inconsistent with a preset target disk sequence, where the target disk sequence is used for indicating that the first disk sequence of the first hard disk backplane precedes the second disk sequence of the second hard disk backplane; and send the first target instruction to the second hard disk backplane via the BMC, whereby the second hard disk backplane enters the low state from the high state.

It is to be noted that when a hard disk backplane is identified, a server allocates a hard disk sequence number, namely, a disk sequence, to hard disks on the hard disk backplane. By way of example, under the premise that there are only two hard disk backplanes, if the first hard disk backplane is identified first and 12 hard disks are expanded on the first hard disk backplane, the server may allocate disk sequences of 0 to 11 to hard disks on the first hard disk backplane, and if the first hard disk backplane is identified later, the server allocates disk sequences of 12-23 to the hard disks on the first hard disk backplane. By comparing the allocated disk sequences of the first hard disk backplane and the second hard disk backplane with a preset target disk sequence, it is possible to determine whether the hard disks are out of sequence.

Before determining that the disk sequences of the first hard disk backplane and the second hard disk backplane are inconsistent with a preset target disk sequence, the BMC 54 is further configured to: acquire disk sequence list information in the SAS card, where the disk sequence list information includes disk sequence information of all hard disk backplanes connected to the SAS card; and acquire the target disk sequence from the disk sequence list information.

Specifically, identified disk sequence list information regarding the disk sequences of the hard disks on the first hard disk backplane and the second hard disk backplane is read from the SAS card. By way of example, as shown in FIG. 3, assuming that the disk sequences corresponding to the first hard disk backplane may be 0-11 and the disk sequences corresponding to the second hard disk backplane may be 12-23, the target disk sequences should be 0-23 in a case that the first hard disk backplane is identified ahead of the second hard disk backplane. At this moment, the previously identified disk sequences may be divided in two cases. In the first case, the identified disk sequences are forward sequences. In other words, the disk sequence list information recorded in the SAS card is 0-23. Then a result indicating that the disk sequence list information is consistent with the target disk sequence may be obtained, and then it may be determined that the identification process is correct. In the second case, the identified disks are out of sequence. In other words, the disk sequence list information recorded in the SAS card is 12-23 and 0-11. Then a result indicating that the disk sequence list information is inconsistent with the target disk sequence may be obtained, and then it may be determined that the identification process is incorrect. It is to be noted that the number of hard disk backplanes is equal to or greater than 1, and the embodiments of the present application are not limited thereto.

When it is determined that the disks are out of sequence, the BMC 54 is further configured to send an IPMI instruction signal to the second hard disk backplane via the BMC, whereby the second hard disk backplane enters the low state from the high state; and directly issue an IPMI instruction to the second hard disk backplane via the BMC in a case that FW of the BMC is in a ready state, whereby the second hard disk backplane enters the low state from the high state.

It will be appreciated that the BMC sends an IPMI instruction signal to an actually succeeding hard disk backplane in a case that the disks have been out of sequence, whereby the actually succeeding hard disk backplane enters the low state, and then an actually top-ranked hard disk backplane may be identified first. It is to be noted that the IPMI instruction is directly sent in a case that the disk sequences of the hard disks have not been identified, that is, the FW of the BMC is in the ready state, whereby the actually succeeding hard disk backplane enters the low state, thereby preventing the hard disks from being out of sequence.

The SAS card 56 is further configured to directly set the identified disk sequence of the first hard disk backplane as the first disk sequence, in a case that the SAS communicates only with a first hard disk backplane of two hard disk backplanes, where the two hard disk backplanes include the first hard disk backplane and the second hard disk backplane.

It will be appreciated that only the actually top-ranked hard disk backplane is in the high state in a case that all the actually succeeding hard disk backplanes enter the low state. At this moment, the identified disk sequence of the actually top-ranked hard disk backplane is the first disk sequence.

The BMC 54 is further configured to send a second target instruction to the second hard disk backplane via the BMC in a case that the disk sequence of the first hard disk backplane has been determined as the first disk sequence, whereby the second hard disk backplane enters the high state from the low state.

It is to be noted that the second hard disk backplane is actually released. When there are three or more hard disk backplanes, it is assumed that corresponding sequence numbers of the hard disk backplanes are 1, 2, and 3 respectively, and an identification sequence of the hard disk backplanes is 1-2-3. Backplane 1 has been identified, and backplanes 2 and 3 are in the low state. At this moment, hard disk backplane 2 is released first, and hard disk backplane 3 is still in the low state. In other words, in a case that the top-ranked hard disk backplane is identified, a hard disk backplane succeeding the top-ranked hard disk backplane is released, while other hard disk backplanes are still in the low state.

The SAS card 56 is further configured to: acquire, after controlling the SAS card to identify the second hard disk backplane in the high state so as to set a disk sequence of the second hard disk backplane as the second disk sequence, a set first disk sequence of the first hard disk backplane and a set second disk sequence of the second hard disk backplane; and determine whether the set first disk sequence of the first hard disk backplane and the set second disk sequence of the second hard disk backplane are consistent with the target disk sequence.

The SAS card 56 is further configured to: report, after determining whether the set first disk sequence of the first hard disk backplane and the set second disk sequence of the second hard disk backplane are consistent with the target disk sequence, a system logic error to a server via the BMC in a case that the set first disk sequence of the first hard disk backplane and the set second disk sequence of the second hard disk backplane are inconsistent with the target disk sequence; and restart the server in a case that the server receives the system logic error.

Specifically, if the first disk sequence and the second disk sequence are still inconsistent with the target disk sequence, the system logic error is directly determined, the error is reported to the server, and the server is restarted. The server carries the first hard disk backplane, the second hard disk backplane, the BMC, and the SAS card.

The motherboard 52 is further configured to: send the first target instruction to both the first hard disk backplane and the second hard disk backplane via the BMC in a case that the SAS card fails to identify the first hard disk backplane and the second hard disk backplane, whereby the first hard disk backplane and the second hard disk backplane enter the low state from the high state; recover the first hard disk backplane from the low state to the high state, and control the SAS card to identify the first hard disk backplane in the high state so as to set the disk sequence of the first hard disk backplane as the first disk sequence; and recover the second hard disk backplane from the low state to the high state, and control the SAS card to identify the second hard disk backplane in the high state so as to set the disk sequence of the second hard disk backplane as the second disk sequence.

It will be appreciated that the IPMI instruction is directly sent in a case that the SAS card does not identify hard disk backplanes, whereby hard disk backplanes other than the first hard disk backplane that is top-ranked are all in the low state, thereby identifying the first hard disk backplane and sequentially releasing and identifying the succeeding hard disk backplanes. For example, assuming that the sequence numbers of the hard disk backplanes are 1, 2, 3, 4, and 5, and the identification sequence of the hard disk backplanes is 1-4-5-2-3, the specific operation is: pulling down 2, 3, 4, and 5, and identifying 1; releasing 4, and identifying 4; releasing 5, identifying 5, releasing 2, identifying 2, releasing 3, and identifying 3.

The BMC 54 is further configured to: clear, after sending a first target instruction to a second hard disk backplane via a BMC, whereby the second hard disk backplane enters a low state from a high state, cache information of the first hard disk backplane and the second hard disk backplane in a server, where the cache information includes the disk sequence of the first hard disk backplane and the disk sequence of the second hard disk backplane; and control, via the BMC, the server to enter the low state. In other words, in a case that the disks are out of sequence, in order for forward sequences, the disk sequence of the first hard disk backplane and the disk sequence of the second hard disk backplane stored in the system are cleared after the second hard disk backplane is pulled down, and the system also enters the low state.

The SAS card 56 is further configured to: determine a duration for which the second hard disk backplane is in the low state; and directly recover the second hard disk backplane from the low state to the high state in a case that the duration exceeds a preset threshold.

Specifically, the preset threshold may be 1 ms or 1 us, which may be set by a user. The preset threshold is reserved time for identifying the disk sequence of the first hard disk backplane. If the duration for which the second hard disk backplane is in the low state exceeds the preset threshold, there may be a delay or error in a release instruction, or there may be an error in identifying the first hard disk backplane, or there may be an error in hardware connection. In this case, the second hard disk backplane is directly released to check whether successful identification is achieved. Furthermore, in a case that there are two or more hard disk backplanes, a different preset threshold may be set for each hard disk backplane in the low state, or a uniform preset threshold may be set for all the hard disk backplanes in the low state.

The BMC 54 is further configured to: acquire all hard disk backplanes connected to the SAS card; acquire a set of hard disk backplanes from all the hard disk backplanes according to a preset rule, where the set of hard disk backplanes includes: the first hard disk backplane and the second hard disk backplane, and all the hard disk backplanes include a plurality of sets of hard disk backplanes; and determine whether a disk sequence of the set of hard disk backplanes is consistent with the preset target disk sequence.

It will be appreciated that there may be a plurality of sets of hard disk backplanes in the system, and it is necessary to determine a set of hard disk backplanes having hard disks that need to be resequenced from the plurality of sets of hard disk backplanes.

The BMC 54 is further configured to: acquire a historical number of occurrences of disk sequence reversal of the plurality of sets of hard disk backplanes; determine a maximum target number of occurrences from the historical number of occurrences; and determine a set of hard disk backplanes corresponding to the maximum target number of occurrences as the set of hard disk backplanes acquired according to the preset rule.

The BMC 54 is further configured to: acquire priority information of occurrences of the plurality of sets of hard disk backplanes; determine a top priority from the priority information; and determine a set of hard disk backplanes corresponding to the top priority as the set of hard disk backplanes acquired according to the preset rule.

It will be appreciated that the preset rule for acquiring a set of hard disk backplanes from all the hard disk backplanes may be that a set of hard disk backplanes having a maximum historical number of occurrences of disks out of sequence is determined as an object to be acquired, or a set of hard disk backplanes having a top priority among a plurality of sets of hard disk backplanes is determined as an object to be acquired.

The BMC 54 is further configured to: acquire, after sending a first target instruction to a second hard disk backplane via a BMC, whereby the second hard disk backplane enters a low state from a high state, acquire a backplane identifier of the second hard disk backplane in a case that the second hard disk backplane fails to enter the low state; determine a first backplane identifier other than the backplane identifier of the second hard disk backplane from a first backplane identifier of the first hard disk backplane and a second backplane identifier of the second hard disk backplane; and control the SAS card to identify the first hard disk backplane corresponding to the first backplane identifier so as to set the disk sequence of the first hard disk backplane as the first disk sequence.

Specifically, in a case that the second hard disk backplane fails to enter the low state, identification is performed according to the backplane identifiers of the hard disk backplanes. In a case that there are only two hard disk backplanes, a second backplane identifier of the second hard disk backplane is acquired, and a backplane identifier other than the second backplane identifier, namely, a first backplane identifier, is identified. When at least one of the following cases exist in the system: there are two or more hard disk backplanes and two or more hard disk backplanes exist in a set of hard disk backplanes, if at least one of the following situations exist: hard disks other than the top-ranked hard disk backplane fail to enter the low state and all hard disks fail to enter the low state, backplane identifiers of the hard disk backplanes that fail to enter the low state are acquired.

The BMC 54 is further configured to directly determine, after recovering the second hard disk backplane from the low state to the high state, the disk sequence of the second hard disk backplane as the second disk sequence in a case that the second hard disk backplane fails to be recovered to the high state.

In other words, in a case that there are only two hard disk backplanes and the second hard disk backplane is identified later, a second disk sequence may be directly determined even if the second hard disk backplane fails to recover the high state after a first disk sequence is identified.

The first hard disk backplane is connected to a first port of the motherboard via the SAS card, and the second hard disk backplane is connected to a second port of the motherboard via the SAS card. The BMC is connected to the SAS card via a bidirectional binary synchronous serial bus I2C. The BMC is connected to the first hard disk backplane via a first GPIO interface and is connected to the second hard disk backplane via a second GPIO interface.

The BMC is further configured to: send an IPMI instruction to the second hard disk backplane, whereby the second hard disk backplane enters the low state from the high state; and/or directly issue the IPMI instruction to the second hard disk backplane in a case that FW of the BMC is in a ready state, whereby the second hard disk backplane enters the low state from the high state.

It is to be noted that the various modules may be implemented by software or hardware. The manner in which the modules may be implemented by hardware is not limited to: all the modules are located in the same processor. Alternatively, the various modules are located in different processors in any combination, respectively.

Figure 6:
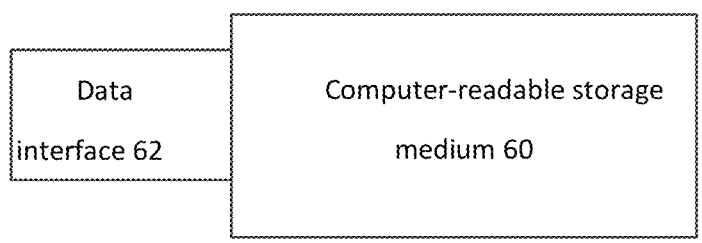
FIG. 6 is a structural block diagram of an optional storage medium according to an embodiment of the present application.

Embodiments of the present application also provide a non-volatile readable storage medium 60 as shown in FIG. 6. The non-volatile readable storage medium 60 has a computer program stored therein. The computer program is configured to perform the steps in any of the foregoing method embodiments at run time.

S1: sending a first target instruction to a second hard disk backplane via a BMC, whereby the second hard disk backplane enters a low state from a high state, where a first disk sequence of a first hard disk backplane precedes a second disk sequence of the second hard disk backplane, and the first hard disk backplane and the second hard disk backplane are connected to a BMC via a hard disk array card (SAS card).

S2: controlling the SAS card to identify the first hard disk backplane so as to set a disk sequence of the first hard disk backplane as the first disk sequence.

S3: recovering the second hard disk backplane from the low state to the high state, and controlling the SAS card to identify the second hard disk backplane in the high state so as to set a disk sequence of the second hard disk backplane as the second disk sequence.

In an exemplary embodiment, the non-volatile readable storage medium 60 may include, but is not limited to, various media capable of storing computer programs, such as a U disk, a read-only memory (ROM), a random access memory (RAM), a removable hard disk, a magnetic disk, or an optical disc.

In addition, as shown in FIG. 6, the non-volatile readable storage medium 60 is further provided with a data interface 62. An electronic device, a processor, or the like may read or write data from or into the non-volatile readable storage medium 60 via the data interface 62.

Embodiments of the present application also provide an electronic device, including a memory and a processor. The memory has a computer program stored therein. The processor is configured to execute the computer program to perform the steps in any of the foregoing method embodiments.

S1: sending a first target instruction to a second hard disk backplane via a BMC, whereby the second hard disk backplane enters a low state from a high state, where a first disk sequence of a first hard disk backplane precedes a second disk sequence of the second hard disk backplane, and the first hard disk backplane and the second hard disk backplane are connected to a BMC via a hard disk array card (SAS card).

S2: controlling the SAS card to identify the first hard disk backplane so as to set a disk sequence of the first hard disk backplane as the first disk sequence.

S3: recovering the second hard disk backplane from the low state to the high state, and controlling the SAS card to identify the second hard disk backplane in the high state so as to set a disk sequence of the second hard disk backplane as the second disk sequence.

In an exemplary embodiment, the electronic device may further include a transmission device and an input/output device. The transmission device is connected to the processor, and the input/output device is connected to the processor.

For specific examples in this embodiment, reference may be made to the examples described in the embodiments and exemplary implementations, and will not be described in detail in this embodiment.

Obviously, a person skilled in the art will appreciate that the various modules or steps of the present application may be implemented by a general-purpose computing apparatus, may be centralized on a single computing apparatus or distributed over a network composed of a plurality of computing apparatuses, and may be implemented by program code executable by the computing apparatus, whereby the modules or steps may be stored in a storage apparatus and executed by the computing apparatus. Moreover, in some cases, the steps shown or described may be executed in a different order than herein or may be fabricated as individual integrated circuit modules, or a plurality of modules or steps thereof may be fabricated as a single integrated circuit module. As such, the present application is not limited to any particular combination of hardware and software.

The above is only a preferred embodiment of the present application, and is not intended to limit the present application. It will be apparent to a person skilled in the art that various modifications and variations may be made to the present application. Any modifications, equivalent replacements, improvements, and the like that come within the principles of the present application are intended to be within the protection scope of the present application.

What is claimed is:

1. A method for adjusting disk sequences of hard disk backplanes, wherein comprising:
   determining that the disk sequences of the first hard disk backplane and at least one second hard disk backplane are inconsistent with a preset target disk sequence, and sending a first target instruction to the at least one second hard disk backplane via a baseboard management controller (BMC), whereby the at least one second hard disk backplane enters a low state from a high state, wherein the preset target disk sequence is used for indicating that a first disk sequence of the first hard disk backplane precedes a second disk sequence of the at least one second hard disk backplane, and the first hard disk backplane and the at least one second hard disk backplane are connected to the BMC via a hard disk array card (SAS card), the first target instruction is an intelligent platform management interface instruction;
   controlling the SAS card to identify the first hard disk backplane so as to set a disk sequence of the first hard disk backplane as the first disk sequence; and
   recovering the at least one second hard disk backplane from the low state to the high state, and controlling the SAS card to identify at least one high-state second hard disk backplane so as to set a disk sequence of the at least one high-state second hard disk backplane as the second disk sequence, wherein the at least one second hard disk backplane, at least one disk sequence of which is subsequent to the disk sequence of the first hard disk backplane, is sequentially restored from the low state to the high state according to the at least one disk sequence of the at least one second hard disk backplane in a case that the first hard disk backplane is recognized.

2. The method according to claim 1, wherein before the determining that the disk sequences of the first hard disk backplane and the at least one second hard disk backplane are inconsistent with a preset target disk sequence, the method further comprises:
   acquiring disk sequence list information in the SAS card, wherein the disk sequence list information comprises disk sequence information of all hard disk backplanes connected to the SAS card; and
   acquiring the preset target disk sequence from the disk sequence list information.

3. The method according to claim 1, wherein the sending a first target instruction to the at least one second hard disk backplane via a BMC, whereby the at least one second hard disk backplane enters a low state from a high state comprises:
   sending at least one intelligent platform management interface (IPMI) instruction signal to the at least one second hard disk backplane via the BMC, whereby the at least one second hard disk backplane enters the low state from the high state; and/or
   directly issuing at least one IPMI instruction to the at least one second hard disk backplane via the BMC in a case that firmware (FW) of the BMC is in a ready state, whereby the at least one second hard disk backplane enters the low state from the high state.

4. The method according to claim 1, wherein the controlling the SAS card to identify the first hard disk backplane so as to set a disk sequence of the first hard disk backplane as the first disk sequence comprises:
   directly setting the identified disk sequence of the first hard disk backplane as the first disk sequence, in a case that the SAS communicates only with a first hard disk backplane of two hard disk backplanes, wherein the two hard disk backplanes comprise the first hard disk backplane and a second hard disk backplane of the at least one second hard disk backplane.

5. The method according to claim 1, wherein the recovering the at least one second hard disk backplane from the low state to the high state comprises:

sending at least one second target instruction to the at least one second hard disk backplane via the BMC in a case that the disk sequence of the first hard disk backplane has been determined as the first disk sequence, whereby the at least one second hard disk backplane enters the high state from the low state.

6. The method according to claim 1, wherein after the controlling the SAS card to identify the at least one high-state second hard disk backplane so as to set a disk sequence of the high-state second hard disk backplane as the second disk sequence, the method further comprises:
   acquiring a set first disk sequence of the first hard disk backplane and at least one set second disk sequence of the at least one second hard disk backplane; and
   determining whether the set first disk sequence of the first hard disk backplane and the at least one set second disk sequence of the at least one second hard disk backplane are consistent with the preset target disk sequence.

7. The method according to claim 6, wherein after the determining whether the set first disk sequence of the first hard disk backplane and the at least one set second disk sequence of the at least one second hard disk backplane are consistent with the preset target disk sequence, the method further comprises:
   reporting a system logic error to a server via the BMC in a case that the set first disk sequence of the first hard disk backplane and the at least one set second disk sequence of the at least one second hard disk backplane are inconsistent with the preset target disk sequence; and
   restarting the server in a case that the server receives the system logic error.

8. The method according to claim 1, wherein comprising:
   sending the first target instruction to both the first hard disk backplane and the at least one second hard disk backplane via the BMC in a case that the SAS card fails to identify the first hard disk backplane and the at least one second hard disk backplane, whereby the first hard disk backplane and the at least one second hard disk backplane enter the low state from the high state;
   recovering the first hard disk backplane from the low state to the high state, and controlling the SAS card to identify the first hard disk backplane in the high state so as to set the disk sequence of the first hard disk backplane as the first disk sequence; and
   recovering the at least one second hard disk backplane from the low state to the high state, and controlling the SAS card to identify at least one high-state second hard disk backplane so as to set the disk sequence of the high-state second hard disk backplane as the second disk sequence.

9. The method according to claim 1, wherein after the sending a first target instruction to the at least one second hard disk backplane via a BMC, whereby the at least one second hard disk backplane enters a low state from a high state, the method further comprises:
   clearing cache information of the first hard disk backplane and the at least one second hard disk backplane in a server, wherein the cache information comprises the disk sequence of the first hard disk backplane and the disk sequence of the at least one second hard disk backplane; and
   controlling, via the BMC, the server to enter the low state.

10. The method according to claim 1, wherein the recovering the at least one second hard disk backplane from the low state to the high state comprises:
   determining a duration for which the at least one second hard disk backplane is in the low state; and
   directly recovering the at least one second hard disk backplane from the low state to the high state in a case that the duration exceeds a preset threshold.

11. The method according to claim 1, wherein whether the disk sequences of the first hard disk backplane and the at least one second hard disk backplane are consistent with the preset target disk sequence is determined by:
   acquiring all hard disk backplanes connected to the SAS card;
   acquiring a set of hard disk backplanes from all the hard disk backplanes according to a preset rule, wherein the set of hard disk backplanes comprises: the first hard disk backplane and the at least one second hard disk backplane, and all the hard disk backplanes comprise a plurality of sets of hard disk backplanes; and
   determining whether a disk sequence of the set of hard disk backplanes is consistent with the preset target disk sequence.

12. The method according to claim 11, wherein the acquiring a set of hard disk backplanes from all the hard disk backplanes according to a preset rule comprises:
   acquiring a historical number of occurrences of disk sequence reversal of the plurality of sets of hard disk backplanes;
   determining a maximum target number of occurrences from the historical number of occurrences; and
   determining a set of hard disk backplanes corresponding to the maximum target number of occurrences as the set of hard disk backplanes acquired according to the preset rule.

13. The method according to claim 11, wherein the acquiring a set of hard disk backplanes from all the hard disk backplanes according to a preset rule comprises:
   acquiring priority information of occurrences of the plurality of sets of hard disk backplanes;
   determining a top priority from the priority information; and
   determining a set of hard disk backplanes corresponding to the top priority as the set of hard disk backplanes acquired according to the preset rule.

14. The method according to claim 11, wherein after the sending a first target instruction to the at least one second hard disk backplane via a BMC, whereby the at least one second hard disk backplane enters a low state from a high state, the method further comprises:
   acquiring a backplane identifier of the at least one second hard disk backplane in a case that the at least one second hard disk backplane fails to enter the low state;
   determining a first backplane identifier other than the backplane identifier of the at least one second hard disk backplane from a first backplane identifier of the first hard disk backplane and a second backplane identifier of the at least one second hard disk backplane; and
   controlling the SAS card to identify the first hard disk backplane corresponding to the first backplane identifier so as to set the disk sequence of the first hard disk backplane as the first disk sequence.

15. The method according to claim 11, wherein after the recovering the at least one second hard disk backplane from the low state to the high state, the method further comprises:
   directly determining one of the at least one disk sequence of the at least one second hard disk backplane as the second disk sequence in a case that the at least one second hard disk backplane fails to be recovered to the high state.

16. A system for adjusting disk sequences of hard disk backplanes, comprising:
a motherboard, a baseband management controller (BMC) arranged on the motherboard, and a first hard disk backplane and at least one second hard disk backplane connected to the BMC via a hard disk array card (SAS card), wherein
the BMC determines that the disk sequences of the first hard disk backplane and the at least one second hard disk backplane are inconsistent with a preset target disk sequence, and sends a first target instruction to the at least one second hard disk backplane, whereby the at least one second hard disk backplane enters a low state from a high state, wherein the preset target disk sequence is used for indicating that a first disk sequence of the first hard disk backplane precedes a second disk sequence of the at least one second hard disk backplane, the first target instruction is an intelligent platform management interface instruction; and
the SAS card identifies the first hard disk backplane so as to set a disk sequence of the first hard disk backplane as the first disk sequence, recover the at least one second hard disk backplane from the low state to the high state, and control the SAS card to identify at least one high-state second hard disk backplane so as to set a disk sequence of the the at least one high-state second hard disk backplane as the second disk sequence, wherein the at least one second hard disk backplane, at least one disk sequence of which is subsequent to the disk sequence of the first hard disk backplane, is sequentially restored from the low state to the high state according to the at least one disk sequence of the at least one second hard disk backplane in a case that the first hard disk backplane is recognized.

17. The system according to claim 16, wherein:
the first hard disk backplane is connected to a first port of the motherboard via the SAS card, and the at least one second hard disk backplane is connected to a second port of the motherboard via the SAS card;
the BMC is connected to the SAS card via a bidirectional binary synchronous serial bus I2C; and
the BMC is connected to the first hard disk backplane via a first GPIO interface and is connected to the at least one second hard disk backplane via a second GPIO interface.

18. The system according to claim 17, wherein the BMC is further configured to: send an IPMI instruction to the at least one second hard disk backplane, whereby the at least one second hard disk backplane enters the low state from the high state; and/or directly issue the IPMI instruction to the at least one second hard disk backplane in a case that FW of the BMC is in a ready state, whereby the at least one second hard disk backplane enters the low state from the high state.

19. A non-transitory computer readable storage medium, storing computer readable instructions, wherein the computer readable instructions, when executed by one or more processors, are configured to cause the one or more processors to:
determine that the disk sequences of the first hard disk backplane and at least one second hard disk backplane are inconsistent with a preset target disk sequence, and send a first target instruction to the at least one second hard disk backplane via a baseboard management controller (BMC), whereby the at least one second hard disk backplane enters a low state from a high state, wherein the preset target disk sequence is used for indicating that a first disk sequence of the first hard disk backplane precedes a second disk sequence of the at least one second hard disk backplane, and the first hard disk backplane and the at least one second hard disk backplane are connected to the BMC via a hard disk array card (SAS card), the first target instruction is an intelligent platform management interface instruction;
control the SAS card to identify the first hard disk backplane so as to set a disk sequence of the first hard disk backplane as the first disk sequence; and
recover the at least one second hard disk backplane from the low state to the high state, and control the SAS card to identify at least one high-state second hard disk backplane so as to set a disk sequence of the second hard disk backplane at least one high-state second hard disk backplane as the second disk sequence, wherein the at least one second hard disk backplane, at least one disk sequence of which is subsequent to the disk sequence of the first hard disk backplane, is sequentially restored from the low state to the high state according to the at least one disk sequence of each second hard disk backplane in a case that the first hard disk backplane is recognized.

20. The non-transitory computer readable storage medium according to claim 19, wherein the computer readable instructions, when executed by one or more processors, are further configured to cause the one or more processors to:
acquire disk sequence list information in the SAS card, wherein the disk sequence list information comprises disk sequence information of all hard disk backplanes connected to the SAS card; and
acquire the preset target disk sequence from the disk sequence list information.

* * * * *